Figures 1, 2:
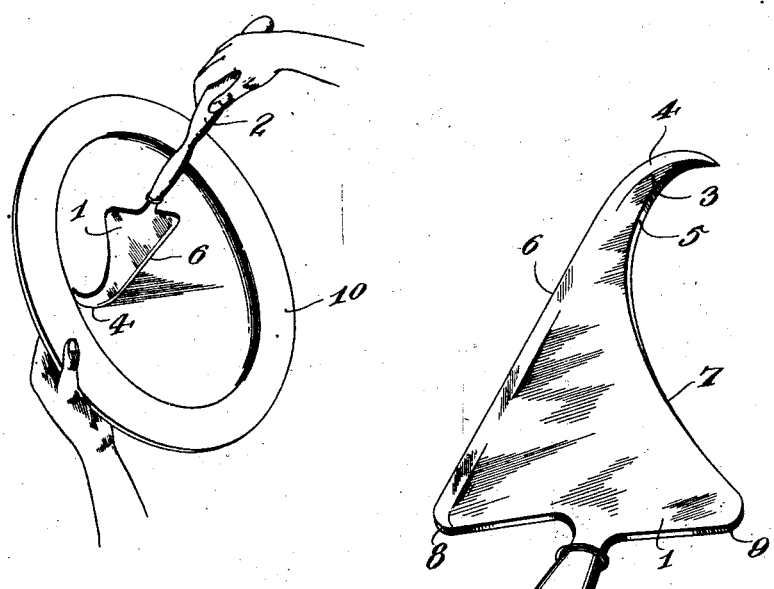

April 6, 1926.

L. E. A. STROUD

SCRAPER

Filed April 3, 1923

1,579,495

Witnesses:

George A. Grace

Inventor
Lillian E. A. Stroud
By Joshua R. H. Potts
Her Attorney

Patented Apr. 6, 1926.

1,579,495

UNITED STATES PATENT OFFICE.

LILLIAN E. A. STROUD, OF PHILADELPHIA, PENNSYLVANIA.

SCRAPER.

Application filed April 3, 1923. Serial No. 629,556.

*To all whom it may concern:*

Be it known that I, LILLIAN E. A. STROUD, a citizen of the United States, residing at Philadelphia, in the county of Philadelphia and State of Pennsylvania, have invented certain new and useful Improvements in Scrapers, of which the following is a specification.

My invention relates to scrapers, more particularly to scrapers adapted for use in scraping sticky foods from dishes and for scraping adhering substances from cooking utensils.

The object is to provide a scraper with which the food may be scraped from round as well as flat surfaces of dishes, and adhering substances may be scraped from utensil corners and crevices which are not readily cleaned by ordinary methods.

This object, and other advantageous ends which will be described hereinafter, I attain in the following manner, reference being had to the accompanying drawings in which—

Figure 1 is a picture view showing the use of my improved scraper, and

Figure 2 a perspective view of my improved scraper.

Referring to the drawing, a plate 1 which may be stamped from sheet steel or other suitable metal, is provided with a handle 2 on one end. The handle may be fixed to the blade in any suitable manner, as is usual in securing handles to knives. The other end of the blade is formed to provide a hook part 3. One edge 4 of the hook part is sharpened and the other edge 5 flat or round. The sharp edge may be used for scraping curved surfaces of dishes or utensils and the point of the hook part may be used for digging out and removing undesirable substances from crevices in the utensils. One edge 6 of the blade is preferably straight and sharpened, and merges into the sharp edge of the hook part 3. The other edge 7 is curved in the direction of the length of the blade and is provided with sharp or rounded corners and merges into the edge 5 of the hook part. The opposite corners 8 and 9 of the blade adjacent the handle are rounded for purposes of scraping curved surfaces having a smaller radius than the hook part.

The utility of the hook part for scraping the round surface of the plate is readily seen by reference to plate 10 of Figure 1. The flat surface or center of the plate is scraped with the straight edge 6 of the blade. Thus the scraping of food from the dishes may be neatly and completely done. When used for scraping and cleaning utensils such as a shallow frying pan, the straight edge with the hook part serves very efficiently in removing the dry grease and carbon from the sides. The hook part may be used in numerous ways for digging and removing adhering substances from the utensils, such as the substance which clogs between the handle and the utensil, under the beaded edge, etc.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

As an article of manufacture, a scraper comprising an elongated blade having top and bottom corners and a rear edge extending between said corners; a handle attached to said rear edge intermediate said corners; a straight scraping edge proceeding from the bottom corner; a curved scraping edge extending upward from the straight edge and forming a convex front edge opposite the rear edge extending between the handle and the bottom corner; and a top edge extending from said top corner on a concave curve toward said straight edge and terminating in a curve merging into said convex front edge, substantially as described.

In testimony whereof I have signed my name to this specification.

LILLIAN E. A. STROUD.